United States Patent [19]
Tyson et al.

[11] Patent Number: 5,901,618
[45] Date of Patent: May 11, 1999

[54] QUIET AND SMOOTH, POSITIVE ACTING, NO-SLIP DIFFERENTIAL

[75] Inventors: Mark V. Tyson, Newport Beach; Peter Dickey, Costa Mesa; Valentine Cucu, Huntington Beach, all of Calif.

[73] Assignee: Vehicular Technologies, Inc., Costa Mesa, Calif.

[21] Appl. No.: 08/962,235

[22] Filed: Oct. 31, 1997

[51] Int. Cl.$^6$ ................................................. F16H 48/12
[52] U.S. Cl. ............................................. 74/650; 192/200
[58] Field of Search ................................ 74/650; 192/200

[56] References Cited

U.S. PATENT DOCUMENTS

| | | | |
|---|---|---|---|
| 1,529,804 | 3/1925 | Nogrady | 74/650 |
| 2,545,601 | 3/1951 | Brubaker | 74/650 |
| 2,638,794 | 5/1953 | Knoblock | 74/650 |
| 2,667,087 | 1/1954 | Myers | 74/650 |
| 2,667,088 | 1/1954 | Myers | 74/650 |
| 2,830,466 | 4/1958 | Myers | 74/650 |
| 2,855,806 | 10/1958 | Fallon | 74/650 |
| 3,131,578 | 5/1964 | Elliott | 74/650 |
| 3,397,593 | 8/1968 | Knoblock | 74/650 |
| 3,791,238 | 2/1974 | Bokovoy | 74/650 |
| 4,104,931 | 8/1978 | Tomich | 74/650 |
| 4,159,656 | 7/1979 | Tomich | 74/650 |
| 4,424,725 | 1/1984 | Bawks | 74/650 |
| 4,524,640 | 6/1985 | Neumann et al. | 74/650 |
| 4,557,158 | 12/1985 | Dissett et al. | 74/650 |
| 4,621,540 | 11/1986 | Davison | 74/650 |
| 4,745,818 | 5/1988 | Edwards et al. | 74/650 |
| 5,413,015 | 5/1995 | Zentmyer | 74/650 |
| 5,590,572 | 1/1997 | Valente | 74/650 |
| 5,603,246 | 2/1997 | Zentmyer | 74/650 |
| 5,637,049 | 6/1997 | Zentmyer et al. | 74/650 |

*Primary Examiner*—Khoi Q. Ta
*Attorney, Agent, or Firm*—Blakely, Sokoloff, Taylor & Zafman LLP

[57] ABSTRACT

A quiet and smooth, positive acting, no-slip differential which automatically connects the two axles together to provide optimum traction for the vehicle, yet releases one axle when the vehicle is proceeding around a curve without drive wheel slippage, whereby only a single axle is engaged through the drive system. The quiet and smooth, positive acting, no-slip differential includes a movable member which, for the disengaged wheel, will shift to a position preventing the driver and coupler teeth from engaging in the normal manner, thereby eliminating the noise and harsh operating characteristic known as "cycling" associated with locking types of differentials. This moveable member does not prevent all engagement, however, so that re-engagement of the driver and coupler will automatically occur to provide the desired differential locking when called upon to do so. A preferred and an alternate embodiment are disclosed.

27 Claims, 13 Drawing Sheets

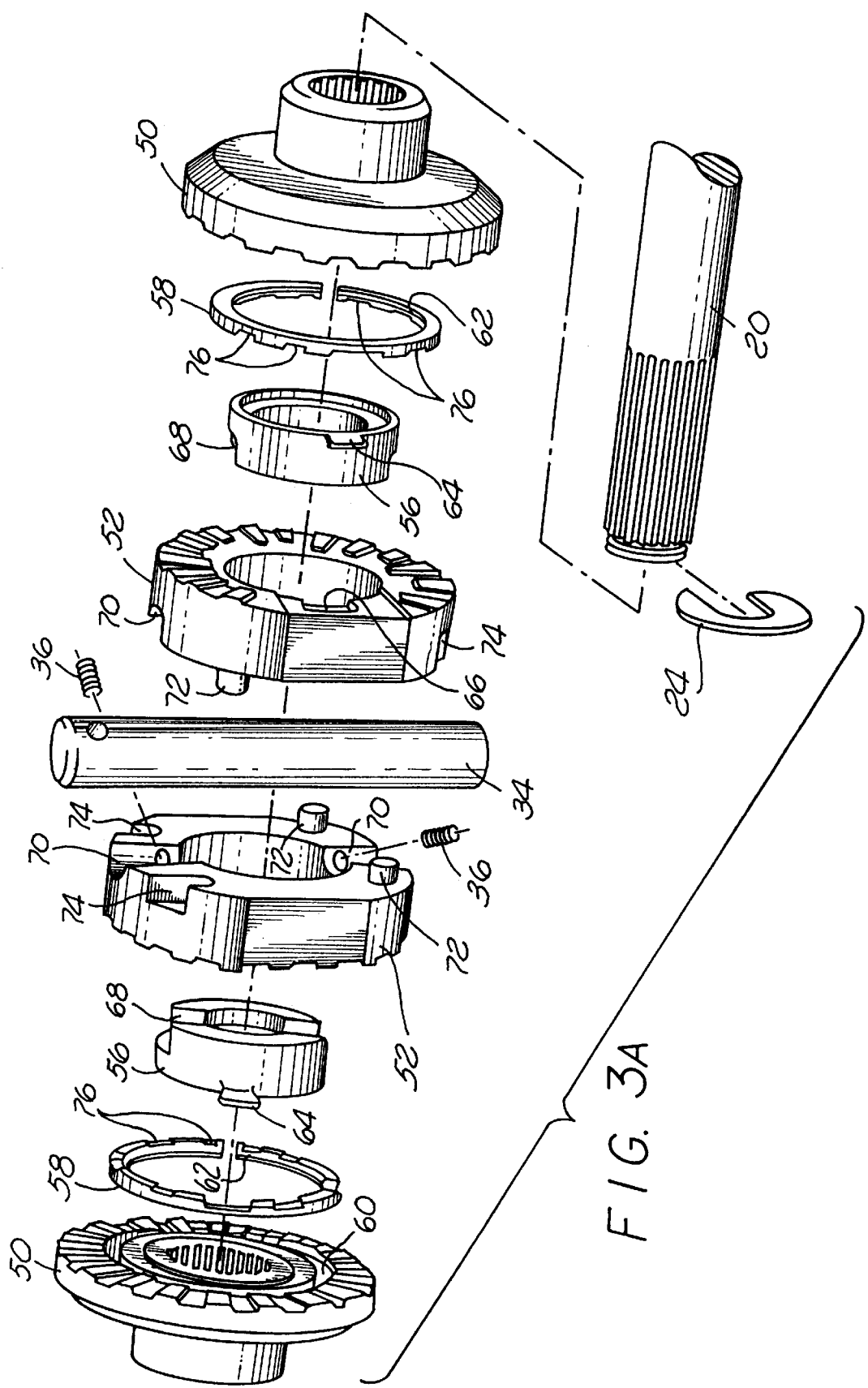

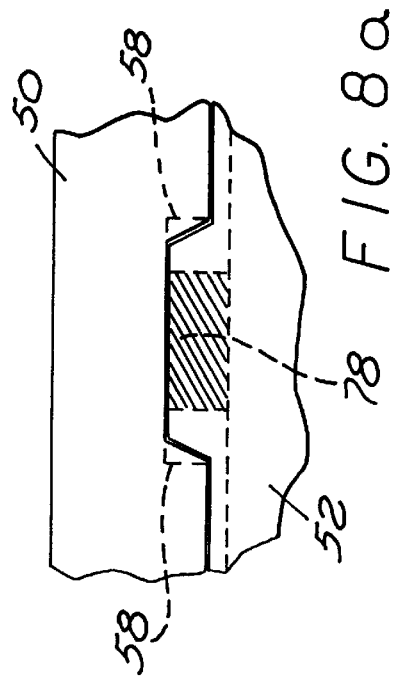
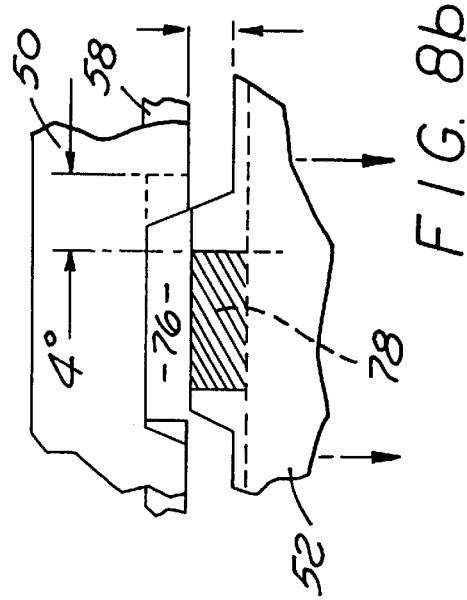
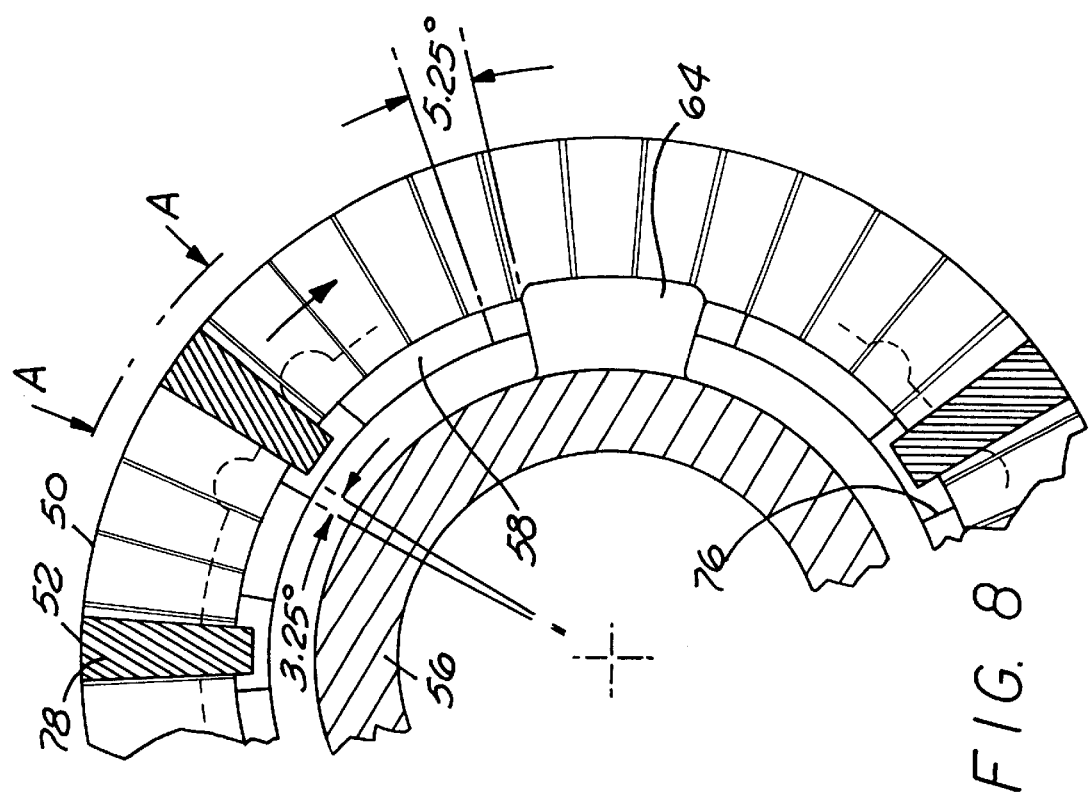

QUIET AND SMOOTH, POSITIVE ACTING, NO-SLIP DIFFERENTIAL

BACKGROUND OF THE INVENTION

1. Field of the Invention

The present invention relates to the field of positively acting differentials for motor vehicles.

2. Prior Art

Land vehicles, such as automobiles, trucks, buses and the like, typically utilize what has become known as an "open differential" for the final drive system. In such a differential, bevel gears are coupled to the inner ends of left and right collinear axles. These bevel gears engage accompanying bevel gears mounted in a differential case. The differential case, in turn, has a ring gear thereon, with the ring gear and differential case being driven in rotation about the axis of the axles by a pinion gear on the drive shaft. The angular velocity of the ring gear and differential case determines the average angular velocity of the two axles. However, the bevel gearset within the differential case between the two axles allows one axle to turn faster and the other axle to turn slower than the ring gear and differential case at any particular time. This, of course, is highly desirable in normal driving, as it allows the axle coupled to the outer wheel to rotate faster than the axle coupled to the inner wheel when going around a curve or turning a sharp corner. It also causes the drive system to deliver the same drive torque to each of the two axles to avoid a tendency for the vehicle to pull to one side or the other when power is applied or removed. The amount of torque that can be transmitted through an open differential is limited to that able to be carried by the wheel with the least amount of traction.

There are certain situations, however, where the aforementioned characteristics of an open differential become undesirable. In particular, when one wheel looses traction, the torque which will be delivered to the wheel with traction will be no higher than the torque delivered to the wheel without traction. For instance, with one drive wheel on ice and the other drive wheel on dry concrete, the torque delivered to the drive wheel on dry concrete will be no higher than can be carried by the wheel on ice. A positive acting differential, however, will effectively couple the two axles together so that they turn in unison, forcing rotation of the drive wheel with greater traction along with the rotation of the wheel with lesser traction. The positive acting differential, as opposed to the open differential, can transmit as much torque as can be carried by the wheel with the most traction. High performance vehicles, off-road vehicles and the like may similarly take advantage of the characteristics of positive acting differentials to improve their traction performance.

The present invention is a significant improvement in a prior art differential manufactured by Vehicular Technologies, Inc., assignee of the present invention, and sold under the trademark "Performance." That prior art device is shown in the exploded view of FIG. 1. While FIG. 2 is a view of the assembled differential of the present invention, the improvements of the present invention are internal to the assembly of FIG. 2, and accordingly, FIG. 2 may also be taken as the next higher assembly of the parts of FIG. 1. Referring to FIG. 1, the splined inner end of axle 20 engages mating splines in a coupler 22, with a similar coupler 22 at the opposite side of the assembly similarly mating at the inner end of the other axle, not shown. In the specific version shown, the axles are retained in position by C clips 24, though in other versions, axle retention may be by way of bearings adjacent to wheel ends of the axles and other means.

The couplers 22 have a plurality of teeth 26 on the face thereof which may mate with corresponding teeth on the faces 28 of drivers 30, depending upon the axial position of the drivers. The drivers 28, in turn, have saddle-like depressions 32 on the opposite faces thereof for loosely surrounding the pinion pin 34 driven by the differential case (see FIG. 2 for the position of the pinion pin in the overall differential assembly). The drivers 30 each have springs 36 in angled blind holes in the driver, the springs acting on pin 34 to both elastically encourage the drivers to a position having the pin 34 aligned with the center of the saddle-like depressions, and to elastically encourage the drivers axially outward away from the pin 34 into engagement with the couplers. Spacers 38, together with any shims or thrust washers that may be required (not shown), establish and retain the couplers 22 at the desired separation from pin 34. Finally, pins 40 on the drivers 30 fit within slots 42 on the opposing face of the opposite driver and function to control the angular displacement of the drivers to each other.

In the final assembly, the springs 36 encourage the toothed face of the drivers 30 into engagement with the toothed face of couplers 22, and there is sufficient clearance between the saddle-like regions 32 and pin 34 in the final assembly for either driver to move toward the pin 34 sufficiently to allow the teeth of a driver 30 to ride over the teeth of the associated coupler 22.

The operation of the prior art device may be explained as follows. With the teeth of the corresponding driver and coupler pairs engaged, the differential housing may rotate, carrying pin 34 from contact with one side of the saddle to the other, a displacement of (depending on the size of the design) 4 to 7 degrees. This free travel, or backlash, is essential for correct positioning of the differential components during the transition from driving to coasting and vice versa. The drivers are retained with respect to each other by pins 40 and mating slots 42 for a total rotation, one relative to the other, approximately 1.5 degrees or less than one-half the total backlash described previously. When the pin 34 engages the saddle-like depressions 32 on either driver, the force of the contact, by design of the saddles, will be angled outward from the plane of the respective driver and will overcome the component of the reaction force acting opposite created by the inclined edges on the mating teeth on the drivers 30 and couplers 22. For example, saddle angles ranging from 30 to 40 degrees are typically used and create outward axial forces that exceed the inward axial forces created by typical 20 to 25 degree inclines of the coupler and driver mating teeth that would otherwise work to separate the driver from the coupler. Using the foregoing parameters, consider first the vehicle at rest. Assume the two drivers 30 each engage with the respective coupler 22, and for specificity in the starting condition, that the pin 34 is centered in the saddle-like depressions 32 in the drivers 30. With the vehicle in gear and engine driving, the pin 34 begins to rotate about the axis of the axle, through the backlash present and compressing against springs 36 to contact the edges of the saddle-shaped depressions 32 in the drivers, and then on further rotation, to force the drivers and couplers, and thus the axles, into rotation. Because the contact angle between the pin 34 and the saddle-shaped depressions 32 exceeds the angle of the edge of the teeth on the couplers and drivers, the force between the pin and the drivers forcing the same into contact against the couplers 22 will exceed the force between the inclined edges of the teeth on the drivers 30 and couplers 22 otherwise tending to force the drivers back toward pin 34, so that the drivers and couplers will remain in positive engagement, regardless of the torque applied to the differential.

If the vehicle now proceeds to drive around a curve, the wheel on the outside of the curve, and thus the coupler 22 associated with that wheel, will tend to rotate faster than the coupler associated with the inside wheel. Assuming power is still being applied, this causes the driver associated with the outside wheel to begin "gaining" with respect to pinion shaft 34, the driver rotating forward to a position wherein the saddle-like depressions 32 thereon are no longer in contact with pin 34. At this point, pins 40 and mating depressions 42 prevent the further relative rotation of the two drivers but allow coaxial translation. Further gaining of the outside wheel continues to rotate the outside coupler at a speed higher than the other differential components. Now, however, the teeth on the driver associated with the outside wheel are free to climb the inclined planes of the teeth on the driver and coupler, with the driver moving toward the pin 34 against the resistance of the associated springs 36 to allow the teeth of the respective driver to slide over the teeth of the respective coupler, repeatedly as required so long as the difference in wheel rotation speeds exist.

If, when in a curve, the vehicle engine is throttled back to coast and use the engine as a braking or vehicle slowing device, the same basic interaction of parts described above will occur substantially in reverse, now however with the driver and coupler associated with the outer wheel of the curve being engaged, and the driver associated with the inner wheel of the curve climbing over the teeth on the associated coupler as required to allow the inner wheel on the curve to turn slower than the outer wheel. Similarly, in backing around a curve such as backing out of a parking place, the inner wheel will be the drive wheel, as in powering forward, whereas use of the engine to retard the motion of the vehicle when backing will engage the wheel on the outer side of the turn engaged. However in any event, when power is applied while turning to the point that traction is lost by the drive (inside) wheel, pin 34 will catch up to and forcibly engage the appropriate side of the saddle-shaped depression 32 on the outside wheel driver 30, forcing both drivers into engagement with their associated couplers to force rotation of both axles in unison.

The foregoing positive acting differential and another manufactured by Vehicular Technologies called "Lock Right" perform well, allowing the drive wheels to rotate independently under normal conditions, but causing the wheels to rotate in unison when either wheel looses traction and begins to slip. The Lock Right design differs from the aforementioned design in that it has no springs located in the saddle to dampen the backlash, rather springs are located between the drivers and thus work directly to force the driver teeth into mesh with those on the adjacent coupler. However, these differential designs contain a few particular operating characteristics that may require the driver to become accustomed to.

In particular, when one wheel begins turning faster than the other, such as when turning into a parking space, one driver will be climbing the teeth on the associated coupler and sliding thereover. When the teeth of the driver again align with the spaces between teeth on the coupler, the driver will fall into engagement with the coupler and shortly thereafter climb the sides of the teeth and again disengage. This makes an audible noise, resulting in a "click, click, click" type sound heard from outside the vehicle. While the angled positioning of springs 36 reduce the sound, it is still noticeable in a conventional automobile. In louder vehicles, such as a high performance vehicle, particularly for one technically versed to understand the source of the sound, the sound is of little consequence. However, to the driver of a more typical, quieter car, the sound can be a distraction, and could be mis-interpreted as a mechanical fault or impending mechanical failure. Secondly, a phenomenon called "cycling" can be induced in manual transmission equipped vehicles. Automatic transmissions do not exhibit the condition because the torque converter always maintains a measure of bias load between the engine and drive axle. With manual transmissions, this event occurs when turning at slow speeds with the clutch pedal depressed, such as when turning into a parking space, temporarily decoupling the transmission from the engine and therefore removing any bias load present on the engaged driver and coupler. When the disengaged driver and coupler teeth pass by each other, they briefly reengage, enabling a load to be placed on the differential and axle components. The components between the differential and the wheel then act like an undamped mechanical spring and release the energy by temporarily accelerating the differential, drive shaft and transmission components. The inertia of these components carries the differential pin against the driver saddle, causing the opposite side driver and coupler to lock and continue to process. The continual wind-up and release will build and eventually become sufficient to "rock" the vehicle driveline and require the transmission be put in neutral or the vehicle stopped in order to cease the cycling. Needless to say, this is highly undesirable and would only be acceptable to the very most forgiving of owners. However all drivers whose vehicles represent a standard "as-delivered" condition would appreciate the increased traction a positive acting differential provides in situations where dry pavement type traction is not available. It would therefore be desirable to provide a differential with substantially the same simplicity as the differentials just described, but which is quiet and smooth in its operation, so as to neither be heard by nor concern the average driver of a vehicle equipped with the positive acting differential.

Another prior art differential is the Detroit Locker manufactured by Tractech, a Titan Wheel Company. In this "locking" type of differential, a cammed spider ring member takes the place of the differential pin and contains negative angle teeth that transfer torque to negative angle teeth on a driven clutch member which is able to slide axially on the splined barrel of the adjacent side gear. A single coil spring holds each driven cam against the spider. The side gear interfaces with the axle through another splined connection. While the driven clutch members separate from the central spider during turns, it is noteworthy to mention than a cam centrally located within the spider forces the driven clutch of the non-driving wheel away from the spider to a point of sufficient separation so that the separation device coupled to the driven clutch can be positioned to maintain the teeth of the driven clutch with slight engagement with the teeth of the spider until relative rotation between the driven clutch and spider again reverses direction. Because the teeth of the driven clutch slightly engage the teeth of the spider before passing over respective corner radii, there is slight sound when turning into a parking place, but reduces the cycling characteristic mentioned previously.

While the Detroit Locker mechanism is functional, it is somewhat complex and in general cannot be assembled into pre-existing single piece differential cases because of access limitations. Accordingly, for the vast majority of vehicles, the original equipment differential case must be removed and a new differential case inserted with the locker assembly therein. This has the disadvantages of the extra cost of the new differential case, as well as requiring relocating the ring gear from the previous differential case to the Detroit Locker differential case, and again setting up the ring gear and drive shaft pinion gear for proper backlash and alignment for proper operation. In contrast, the positive acting differential developed by Vehicular Technologies herein described can be assembled into original equipment differential cases most often without removal of the differential from the vehicle, avoiding the expense of a new differential case and the time and skill required to again set up the spacing between the ring and pinion gearset.

BRIEF SUMMARY OF THE INVENTION

A quiet and smooth, positive acting, no-slip differential which automatically connects the two axles together to provide optimum traction for the vehicle, yet releases one axle when the vehicle is proceeding around a curve without drive wheel slippage, whereby only a single axle is engaged through the drive system and operates in both drive and coast conditions. The quiet and smooth, positive acting, no-slip differential includes a movable member which, for the disengaged wheel, will shift to a position preventing the driver and coupler teeth from engaging in the normal manner, thereby eliminating the noise and harsh operating characteristic known as "cycling" associated with locking types of differentials. This moveable member does not prevent all engagement, however, so that re-engagement of the driver and coupler will automatically occur to provide the desired differential locking when called upon to do so. The quiet and smooth, positive acting, no-slip differential requires a specially designed pin saddle to enable positioning of the movable member by a controlled displacement. A preferred and an alternate embodiment are disclosed.

BRIEF DESCRIPTION OF THE DRAWINGS

FIG. 3a is an exploded perspective view of the quiet and smooth, positive acting, no-slip differential of FIG. 2 illustrating the various parts of one embodiment of the present invention.

FIGS. 8, 8a and 8b are views similar to FIG. 7, illustrating the relative part positions as the coupler being illustrated continues to rotate faster than the coupler for the wheel still being driven and the teeth on the driver 52 begin to climb the teeth on the coupler 50.

DETAILED DESCRIPTION OF THE INVENTION

Figure 1:
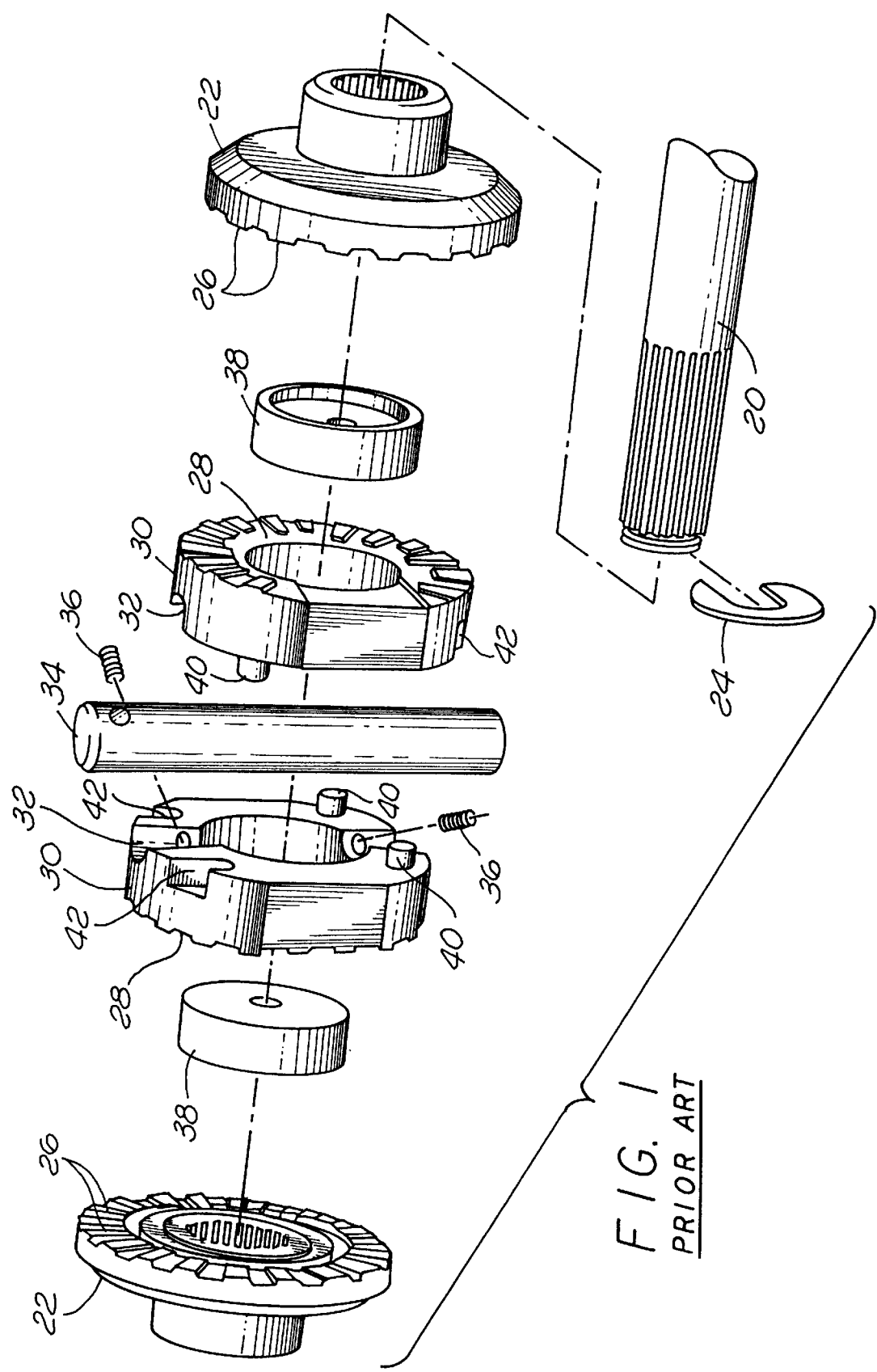
FIG. 1 is an exploded perspective view of a prior art locking differential.
Figure 2:
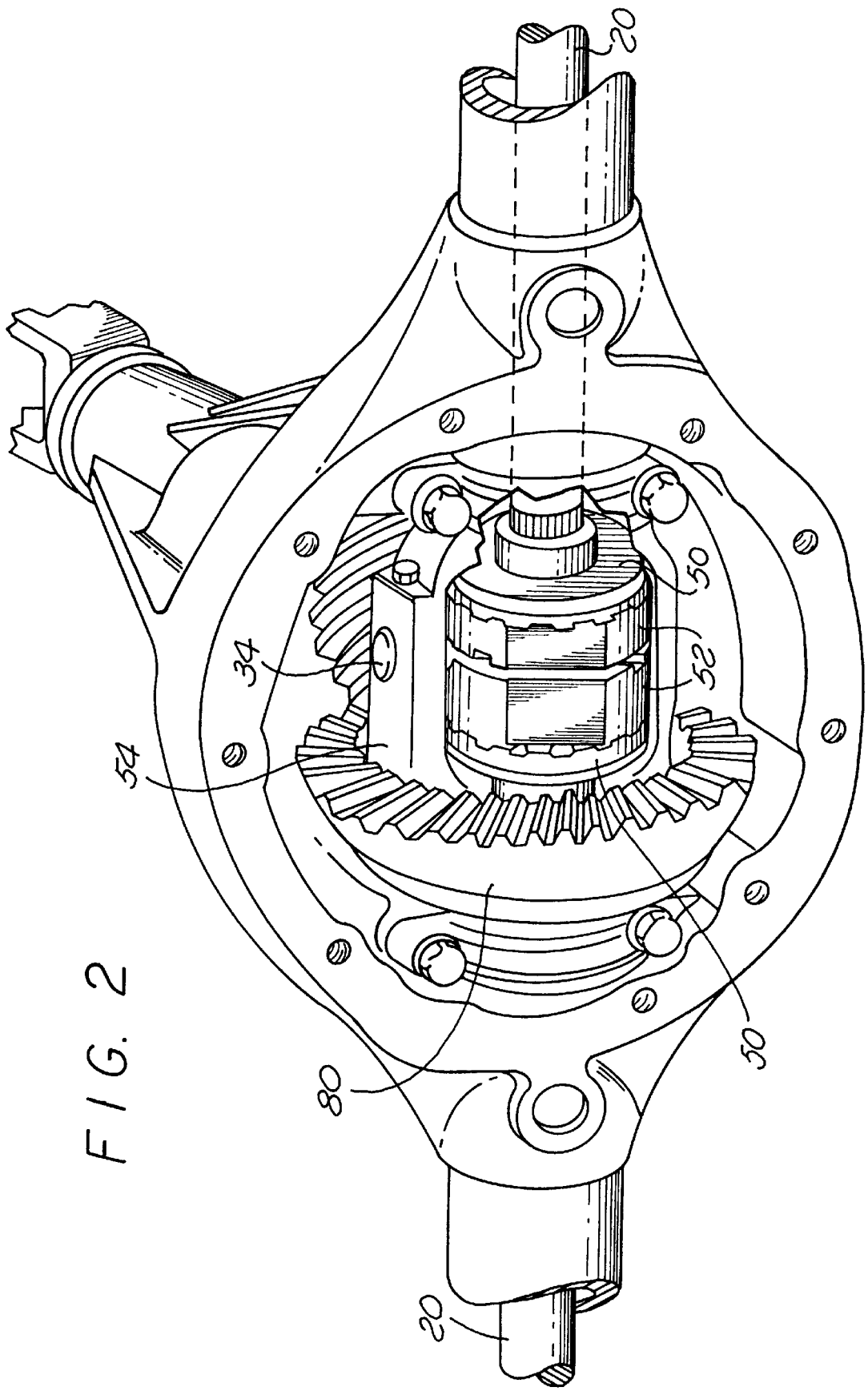
FIG. 2 is a rear view, cover off, of a differential incorporating the present invention.
Figure 3B:
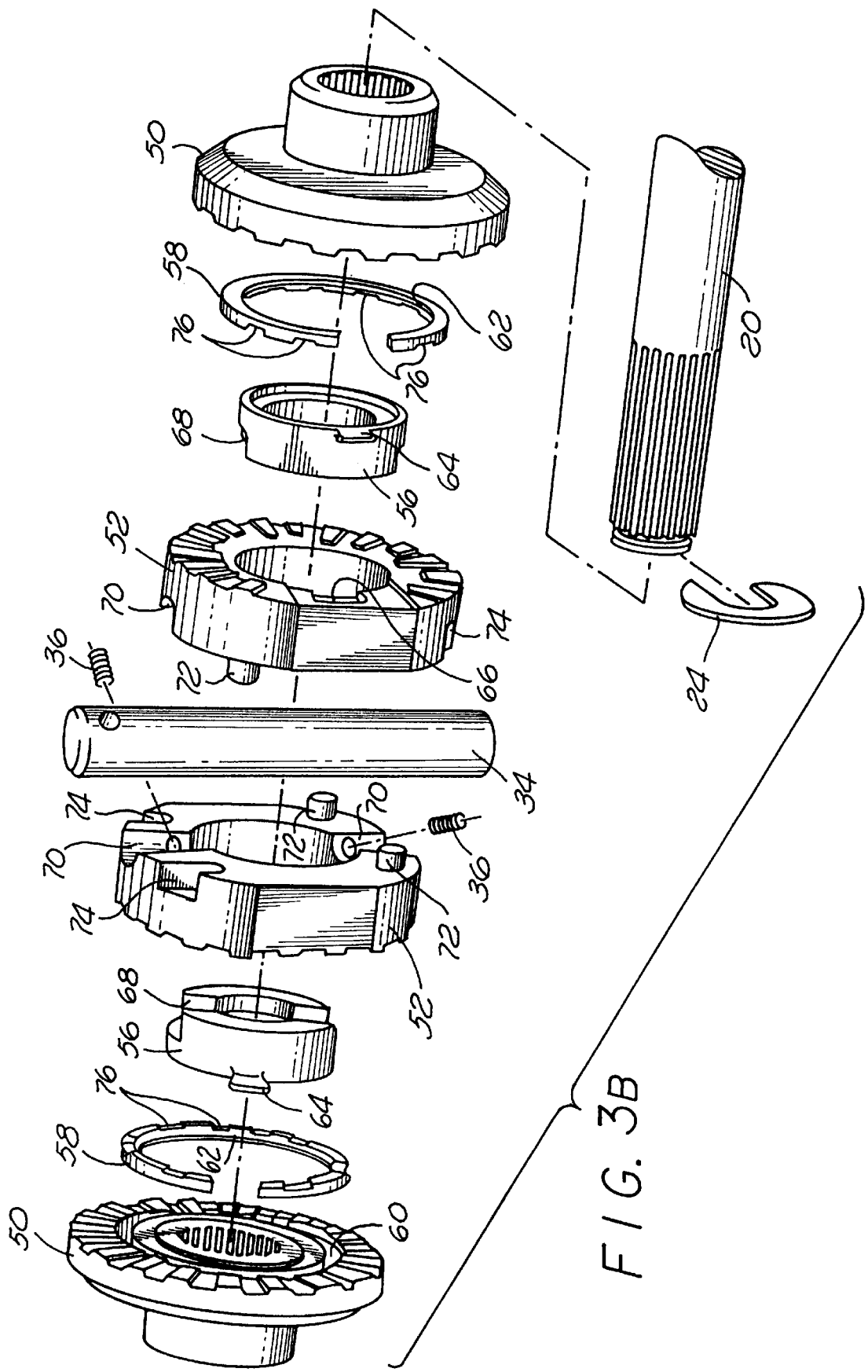
FIG. 3b is an exploded perspective view of the locking differential of FIG. 2 illustrating the various parts of the present invention shown with an alternate embodiment of circlip 58.
Figure 4:
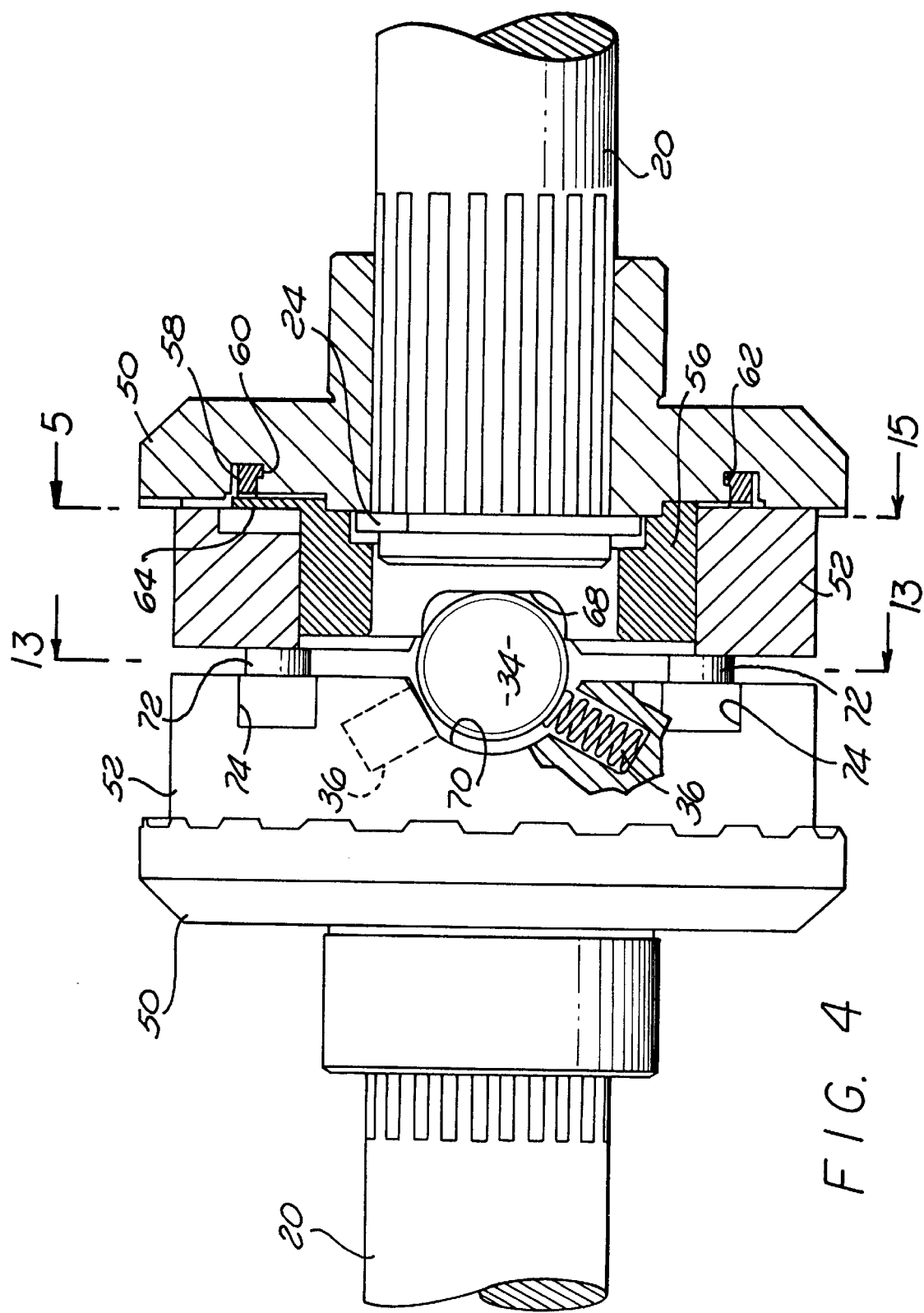
FIG. 4 is a partial cross section of the locking differential of FIG. 2.

Now referring to FIG. 2, a differential incorporating the present invention may be seen. The parts of the locking differential of the present invention visible in this Figure include couplers 50 and driver 52 fitting within differential case 54. The locking differential shown in FIG. 2 is shown in an exploded view in FIGS. 3a and 3b, similar to the exploded view of the prior art locking differential of FIG. 1, but further illustrating the additional parts making up the locking differential of the present invention. As shown therein, in addition to couplers 50 and drivers 52, the preferred embodiment of the present invention includes spacers 56 and circlips 58. Circlips 58 fit within a relief 60 in the face of each coupler 50. As may be seen in FIGS. 3 and 4, the relief 60 has an undercut therein into which a projecting flange or ridge 62 will snap, retaining each circlip 58 at a fixed axial position with respect to the respective coupler 50. While the undercut is depicted in FIG. 4 toward the axis of the assembly, the undercut could be equally functionally placed on the outer surface of relief 60. Also, the inner or outer functional diameter of the circlip 58 is slightly less than or greater than the recess 60 so that the circlip, once deflected within its elastic range and snapped into position into the respective coupler 50, will remain slightly elastically deformed after installation so as to have adequate drag with respect to the respective coupler to rotate with the respective coupler unless forcibly prevented from doing so.

The spacers 56 each have a paddle-like projection 64 thereon, which fit into a specific location of the circlip 58, either within the split or open space between the circlip ends, or in the central region of the circlip curvature. In the preferred embodiment described herein, the paddle width is smaller than opening within the circlip in such a manner as to allow a 10° total rotation of the circlip 58 relative to the spacer. This relative motion could range from a minimum equal to half the driver to driver displacement plus the desired driver tooth overlap, to just less than the total angle between the individual teeth of the driver. Thus within that given freedom, each circlip 58 will rotate in unison with the respective coupler 50, though the circlip will be restrained by the paddle 64 when contacting the same and will no longer rotate with the respective coupler should the coupler continue to rotate beyond that specified freedom. In that regard, note that when the paddle is positioned between the circlip ends, the force on the circlip 58 when the opening therein contacts the paddle 64 is a force tending to open the circlip, resulting in reduced or increased frictional engagement of the inner or outer diameter of the circlip with the recess 60 in the respective coupler.

Figure 12:
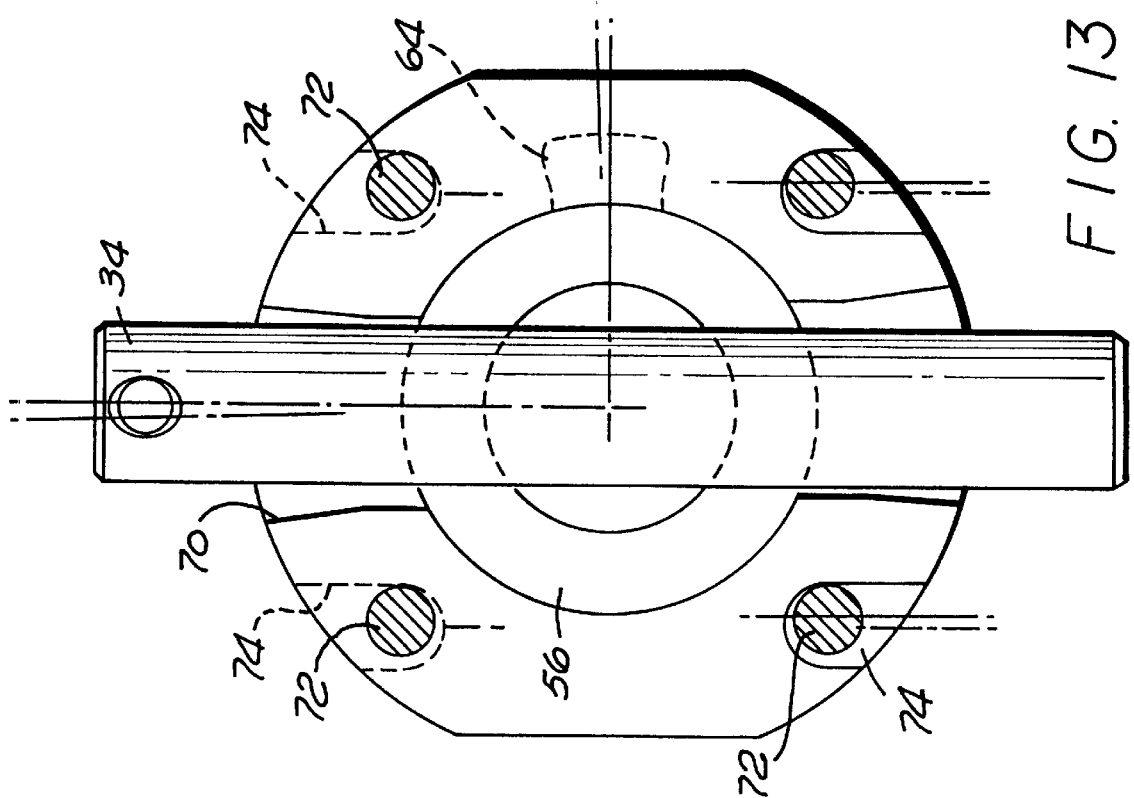
FIG. 12 illustrates the position of the pins 72 in slots 74 when the drivers are in alignment. It also shows the saddle-like depressions 70 of the two drivers centered with respect to pin 34.
Figure 13:
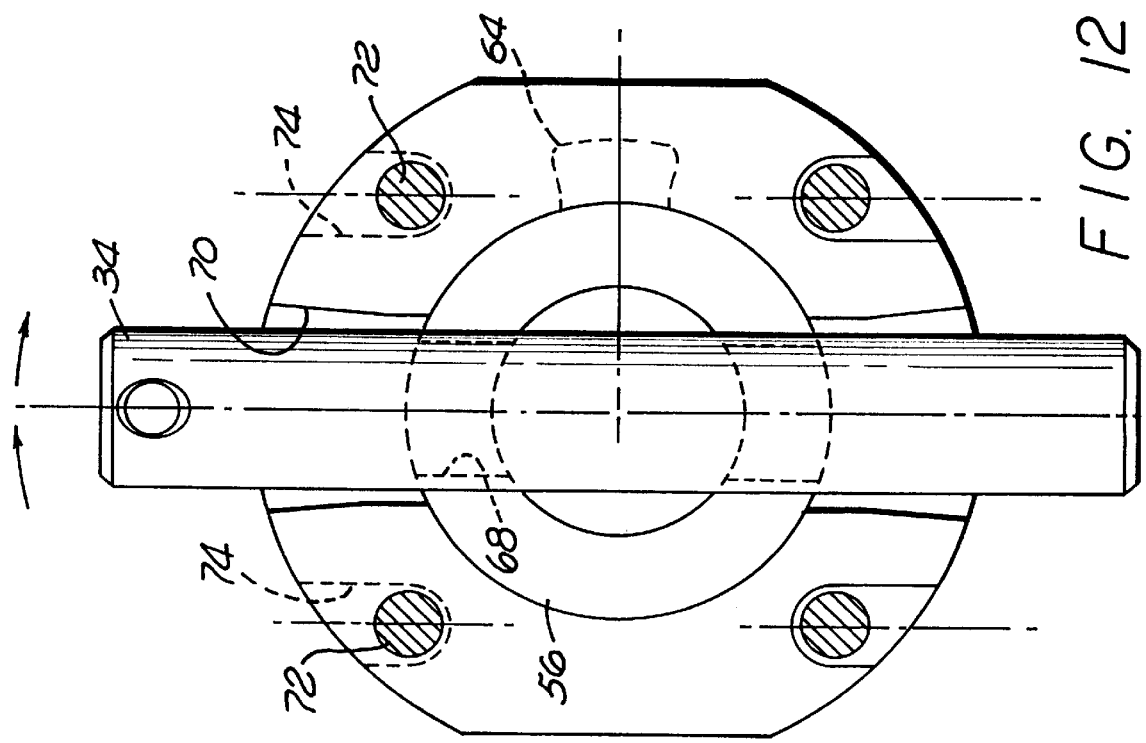
FIG. 13 illustrates the position of the pins 72 in slots 74 when one driver is advanced relative to the other driver remaining with pin 34 engaged with the side of the saddle-like depression.

As may be seen in FIG. 3, each driver 52 has a relief 66 therein for receiving paddle 64 on the spacer 56. This relief, however, is for single piece case assembly purposes only, allowing the spacers 56 to fit within the inner diameter of the respective drivers 52 to be flush with the face thereof, so as to allow the parts to slide into the one-piece differential case 54 (FIG. 2). Once installed, the spacers 56 are each moved axially toward their respective couplers 50 so that the paddles 64 fit within the gap in the circlips 58. The spacers 56 are retained in their final position by the insertion of pin 34, and shoes 82 as shown in the alternate embodiment, which have a close fit with slots 68 in the spacers 56 in the final assembly. Thus, spacers 56 in the final assembly have no intentional rotational freedom about the axis of the assembly relative to pin 34, but rather in essence rotate in unison with the pin and, thus, with each other. This is to be compared with the drivers 52, which as with the prior art locking differential herein before described, have a total rotational freedom about the axis of the assembly with respect to pin 34 of approximately 5° because of the loose fit of the saddle-shaped depressions 70 on the drivers. Similarly, the drivers 52 have a relative rotation capability, one to the other, of approximately 1.5°, determined by the fit of pins 72 and slots 74 in the drivers. This is illustrated in FIGS. 12 and 13, wherein FIG. 12 illustrates the position of the pins 72 in slots 74 when the drivers are in alignment and having their saddle-like depressions 70 centered with respect to pin 34 of the two drivers, and FIG. 13 illustrates the position of the pins 72 in slots 74 when pin 34 is engaging the sides of the saddle-like depressions on one driver and the other driver is advanced with respect to pin 34.

Finally, certain teeth on the face of drivers 52 extend to a diameter different than the teeth on the couplers, and the remaining teeth on the drivers. A protrusion is formed by these extended teeth that is intended to work with slots in the circlip, and is noteworthy to mention that a circular pattern of protrusions could be formed separate from the teeth and be just as functional, however, perhaps not as efficient to produce as the extended teeth. These protrusions have the same spacing as the slots 76 in the circlips 58 and in the embodiment presented, will fit within slots 76 with a total angular freedom between a driver 52 and a circlip 58 of approximately 9.6 degrees. This opening can range however, from a minimum of half the saddle backlash to a maximum equal to the angle between driver teeth plus half the saddle backlash.

Figure 5:
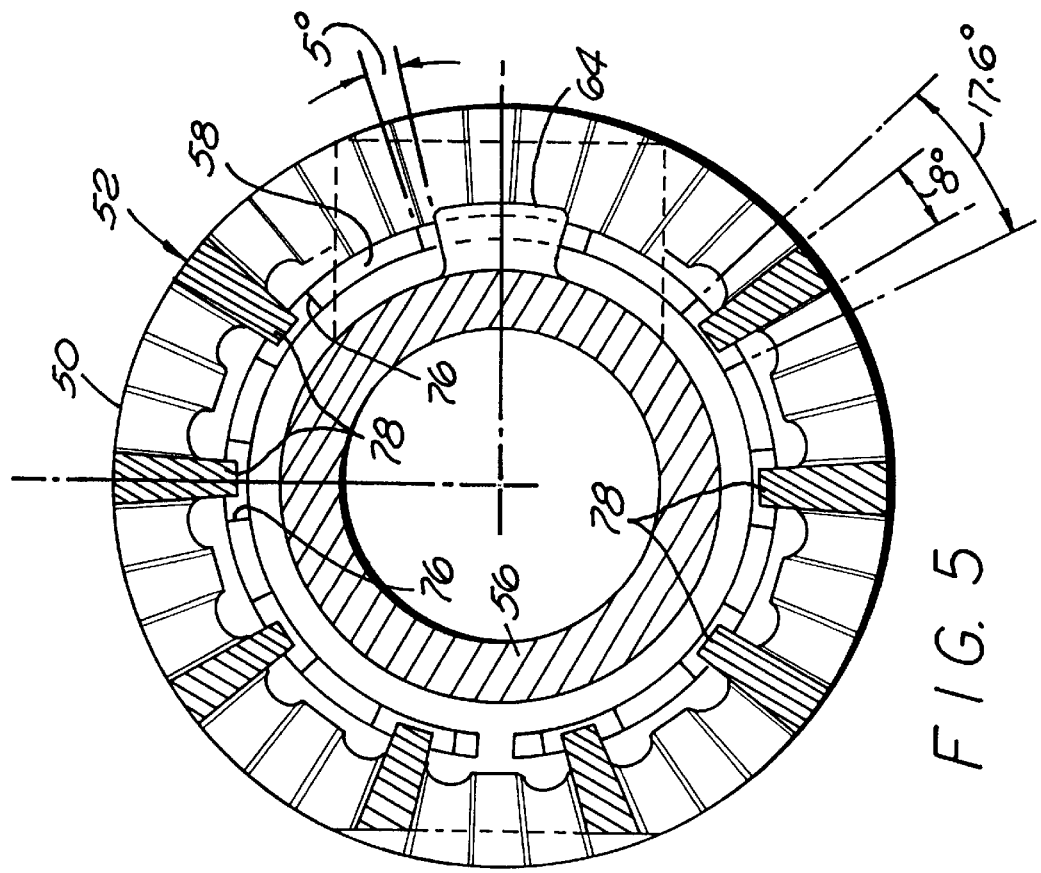
FIG. 5 is a cross section through the locking differential of the present invention taken along the line 55 of FIG. 4 and showing the parts in a symmetrical positions.

The general relationship just described may be seen in FIG. 5, which is a cross section through the locking differential taken along the line 5–5 of FIG. 4, though with only the cross section of the extended teeth of the driver, not all teeth of the driver, being shown so as to make the coupler teeth thereunder be viewable from the Figure. This allows the relative positions of the driver and the associated coupler to be easily viewed, though a true cross section would show all teeth of the driver in cross section, tending to obscure the relative position of the associated coupler thereunder. This illustrative license is continued in FIGS. 6 through 11 for the same ease of visualization purposes.

FIG. 5 illustrates the fitting of the paddle 64 in the gap of the circlip 58, as well as the fitting of the protrusions formed by the extended teeth 78 of the drivers 52 into the slots 76 in the circlips 58. In this Figure, all parts are angularly centered with respect to each other, the paddle 64 being centered in the gap in the circlip, the extended teeth 78 being centered in the slots in the circlip, and of course since the spacer 56 is rotationally locked with respect to pin 34 (FIG. 3), the drivers 52 are necessarily positioned with their saddle-like depressions 70 centered with respect to pin 34.

As with the prior art, when the pin 34 engages the saddle-like depressions 70 on either driver, the force of the contact, by design of the saddles, will be angled outward from the plane of the respective driver. The present invention includes a departure from the prior art related to the design of the saddle by including the displacement of the circlip. Previous saddle designs use pin and slot geometry that center the disconnecting driver saddle on the drive pin and generate a helical surface running from a cutter depth equal to the radius of the pin out beyond the top surface of the driver. The depth of the saddle is held equal to the pin radius and the thickness of the driver is such that when the driver is disconnected, the inner surface of the driver does not pass the centerline of the pin. These features facilitate manufacturing, but do not optimize backlash, and enable both drivers to become inadvertently disconnected at the same time. The present invention uses increased driver thickness to prevent simultaneous disconnection of both drivers, and uses saddle geometry that optimizes backlash while creating conditions for correct positioning of the circlip. Backlash is optimized by recognizing that the driver needs to displace an amount only slightly greater than the height of the teeth multiplied by the tangent of the maximum saddle angle. The result is much less than half the saddle travel as used in previous designs. This minimum displacement is further modified by adding an amount to achieve a desired displacement of the pin and effect removal of the overlap of the circlip with the protruding teeth of the driver when the vehicle changes from driving to coasting. This amount is determined by examining the free travel of the pin from contact with the near-side of the connected driver saddle to contact with the far-side of the disconnected driver saddle. This travel must be such that by virtue of the pin carrying the spacer whose paddle moves the circlip, the circlip is moved out from between the teeth of the driver and coupler such that the teeth will mesh when synchronized. Once meshed, the teeth can then transmit torque, both driving and coasting/braking.

Also again, the edges on the mating teeth on the drivers 30 and couplers 22 are not square, but rather are inclined at an angle less than that of the saddle. Consequently the net outward force when the pin 34 is forcibly engaged with the drivers keeps the teeth on the drivers from climbing the sides of the teeth on the couplers, but allows the climbing of the teeth when pin 34 is not forcibly engaged with the respective driver. It can be shown that for typical dimensions used for the tooth height and driver and coupler diameters, the total rotation of a driver relative to the respective coupler from the beginning of driver teeth climbing on the coupler teeth to the point where climbing is complete and the top of the driver teeth will begin to slide over the top of the coupler teeth is approximately 0.75°.

The foregoing angular motion limits for the embodiment contained herein may be summarized as follows:

| Parts | Angular motion limits |
| --- | --- |
| Driver to pin 34 | 2.5° |
| Driver to driver | 1.5° |

-continued

| Parts | Angular motion limits |
|---|---|
| Paddle to pin 34 | 0° |
| Paddle to ring | 5° |
| Ring to extended tooth on the driver | 4.8° |
| Driver to coupler tooth climbing - start to finish | ~0.75° |

Figure 6:
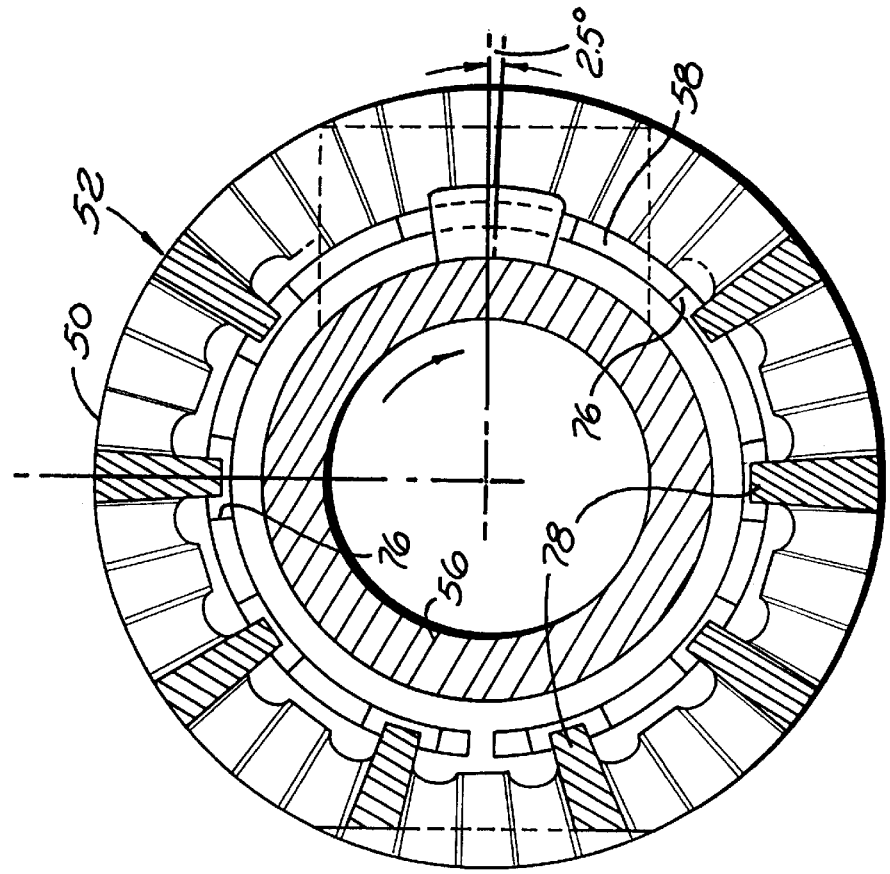
FIG. 6 is a view similar to FIG. 5, illustrating the relative part positions as the ring gear 80 (FIG. 2) begins to rotate.

FIG. 5 represents an arbitrary starting point for the description of the operation of the present invention, though represents a good point to start the description, as it illustrates the general symmetry of the structure and thus the similarity in the operation of the various parts while the vehicle is powering forward, powering in reverse, using the engine to retard forward motion or using the engine to retard rearward motion. Starting from the condition of FIG. 5, as the ring gear 80 (FIG. 2) begins to rotate, pin 34 (FIGS. 2 and 3) initially rotates spacer 56 and paddle 64 2.5 degrees, as shown in FIG. 6. In that regard, it is to be remembered that spacer 56 is essentially coupled to the pin 34 (FIGS. 2 and 3) so as to rotate with the pin and thus with the ring gear. Also, the frame of reference for this Figure as well as FIGS. 5 through 11 is the driver, and accordingly, all of the foregoing Figures have the extended driver teeth shown in cross section in the same position, with the other parts of the assembly moving as appropriate to illustrate the relative positions of the parts during various phases of operation hereafter described.

When the spacer 56 has rotated 2.5 degrees as in FIG. 6, paddle 64 approaches one end of the opening within circlip 58. At the same time, the pin 34 (FIGS. 2 and 3) is forced against the saddle-like depression 70 in the driver so that no further clockwise rotation of the paddle with respect to the driver 52 may occur. Under this condition, the pin 34 pushing against the edge of the saddle-like depression in the driver forces the driver into engagement with the teeth of the coupler 50 to provide a positive drive for the respective axle of the vehicle.

Figure 7:
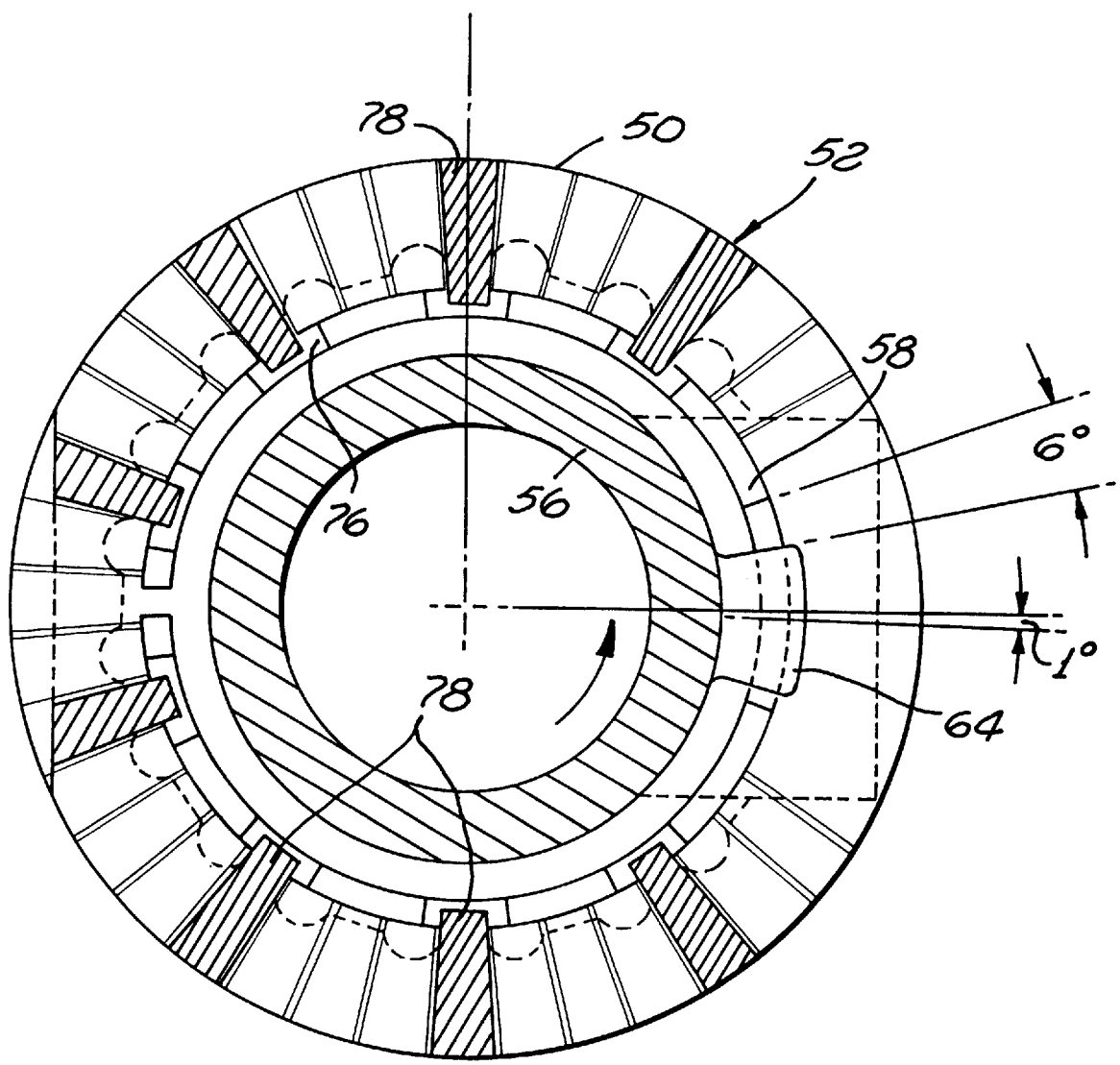
FIG. 7 is a view similar to FIG. 6, illustrating the relative part positions when the wheel for the assembly being illustrated begins to rotate slightly faster than the opposite wheel, as when the vehicle begins to be powered around a curve.

Assuming both axles of the vehicle are being driven, FIG. 7 illustrates what happens when the wheel for the assembly being illustrated begins to rotate slightly faster than the opposite wheel, as when the vehicle begins to be powered around a curve. Specifically, coupler 56 rotates to the relative position with respect to driver 52 shown in FIG. 7, the coupler 50 driving the driver to a position advanced with respect to pin 34. However, assuming the other axle is still being driven, the driver 52 for the wheel turning faster will reach the limit of its rotational capability with respect to the opposite driver of 1.5 degrees because of the engagement of the pins 72 and the slots 74. Accordingly, as the coupler being illustrated continues to rotate faster than the coupler for the wheel still being driven, the teeth on the driver 52 begin to climb the teeth on the coupler 50, as illustrated in FIG. 8. As the coupler rotates in the direction of the arrow shown therein, the total relative angular rotation between the coupler and driver for the driver teeth to fully climb the teeth on the coupler is on the order of 1 degree or less, in the exemplary embodiment being approximately 0.75 degrees. This brings the circlip 58 to within approximately 5.25 degrees of the paddle 64 and the extended teeth 52 within approximately 3.25 degrees of the edge of the slots in the circlip 58. This is shown in FIGS. 8a and 8b, illustrating the extended teeth 78 and the driver 52 relative to the slot in the circlip 58 before the climbing of the teeth on the coupler 50 begins, and again just after climbing has been completed.

Of particular importance is the relative location of the parts after such climbing has been completed. In particular, the top of the teeth on the driver 52 are now free to slide across the top of the teeth on coupler 50. Further, the top of circlip 58 is slightly spaced from the top of the teeth on the driver 52, something in the order of a few thousandths of an inch. Thus, while there is still a slight separation between the extended tooth 78 and the edge of a slot in circlip 58, the circlip 58 is in fact free to move to a position slightly under the top of the extended tooth 78. In the preferred embodiment this engagement is on the order of 0.020 to 0.060 inches.

Figure 9:
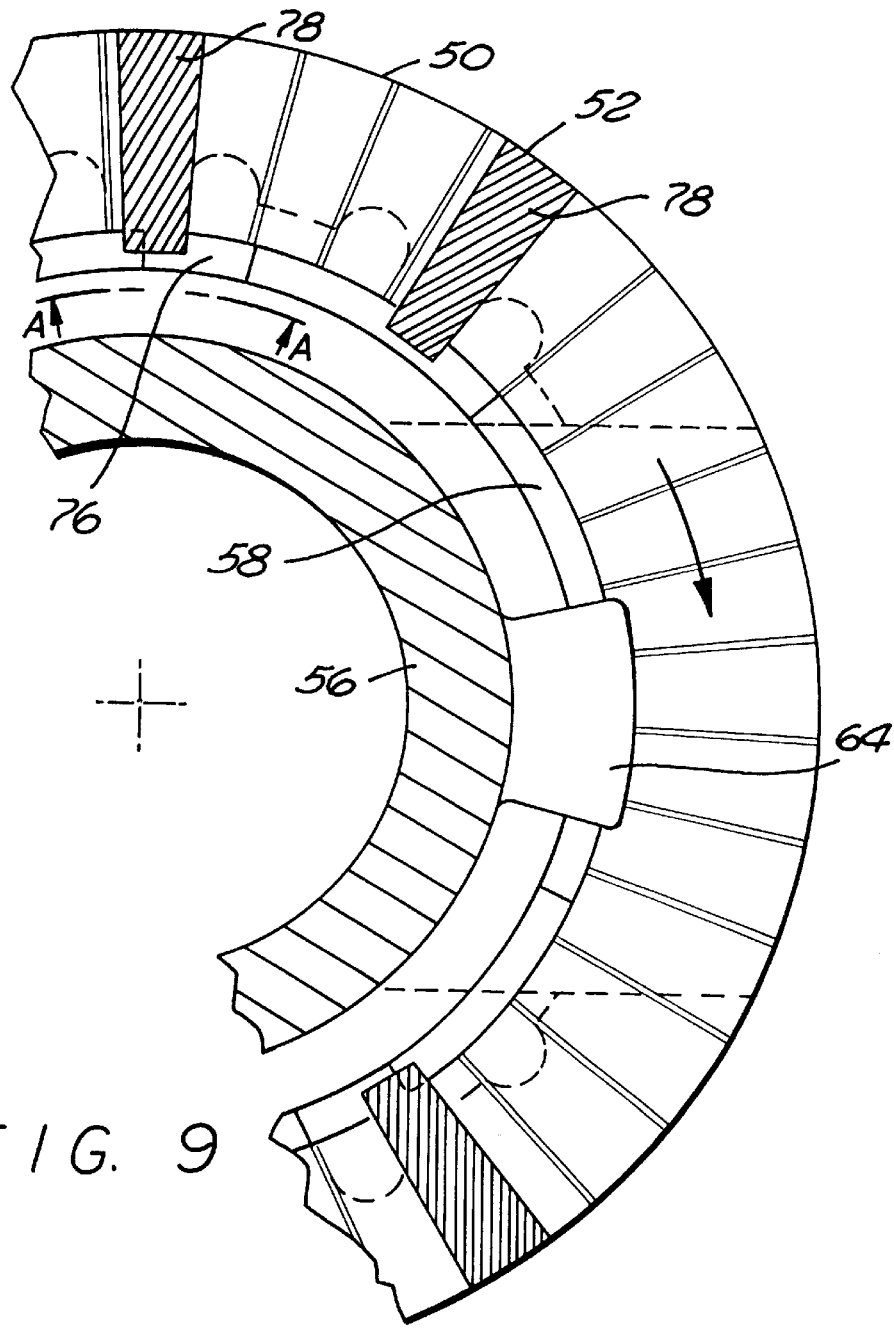
FIG. 9 and 9a illustrating the relative part positions as the coupler being illustrated continues to rotate relative to the driver from the position shown in FIG. 8.
Figure 9A:
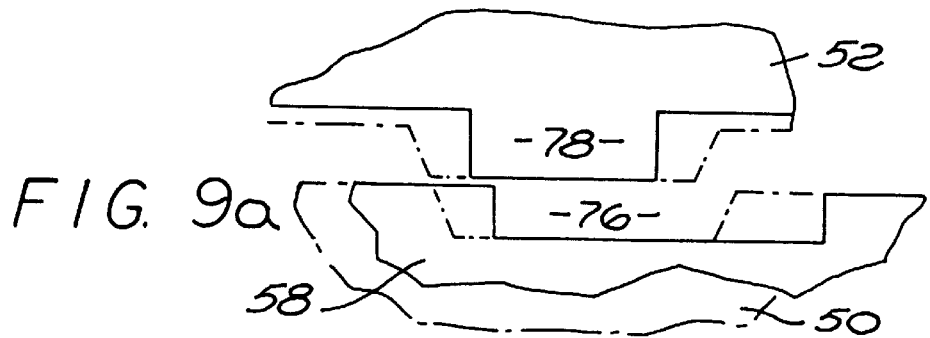

As the coupler 50 continues to rotate relative to the driver, circlip 58 will continue to rotate with the coupler 50 another 5.25 degrees before contacting paddle 64. This will bring circlip 58 under the extended teeth on driver 52, as shown in FIG. 9, and more clearly in FIG. 9a. Because the coupler 56 is essentially locked to the pin 34 (FIG. 3) and driver 52 is limited against further motion by pins 72 and slots 74 between the two drivers (see FIG. 3), the driver 52 and the spacer 56 will remain in the position shown in FIG. 9 as will circlip 58, the circlip slipping on the coupler as the coupler continues to rotate in the direction shown. On continued rotation of the coupler in the same direction, each time the coupler teeth come into alignment for potential engagement with the driver teeth, the circlip 58 will engage the extended teeth in the driver to prevent such engagement. This eliminates the noise of the repeated engaging and disengaging of the freewheeling driver and coupler experienced in the prior art. Of particular importance to achieve this is the fact that the circlip surface adjacent the edge of each of slots 76 therein (see FIGS. 3 and 5) will just barely clear the extended tooth on the driver after the teeth climbing has been completed.

Figure 10:
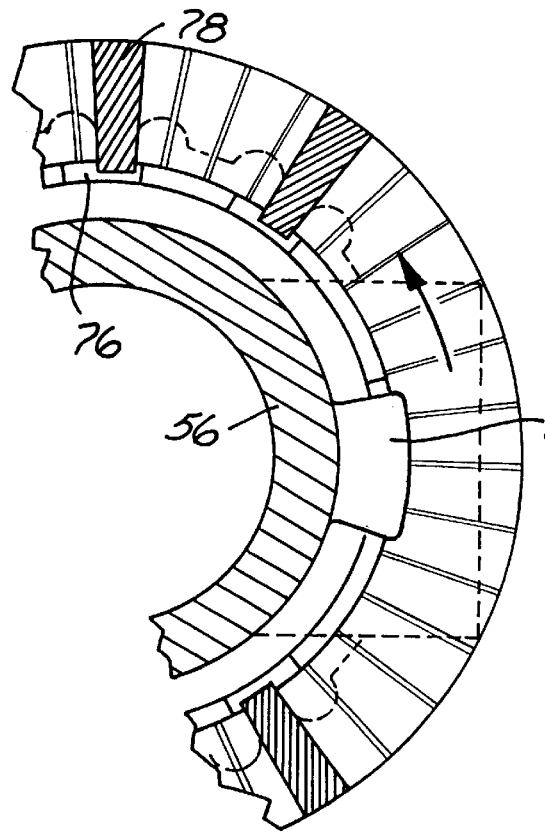
FIG. 10 illustrates the relative part positions as the coupler 50 begins to rotate in the counter-clockwise direction with respect to the driver 52.
Figure 11:
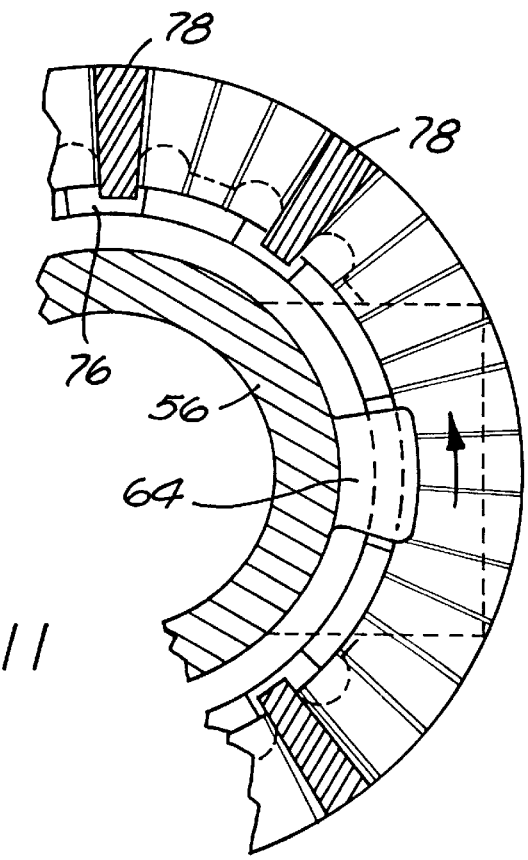
FIG. 11 illustrates the relative part positions after the teeth on the coupler and driver re-engage.

Now assume that the vehicle, still being powered, comes out of the first curve and enters a curve in the opposite direction. In this case because of the change in relative speed, the coupler 50 begins to rotate in the counter-clockwise direction with respect to the driver 52, as illustrated in FIG. 10, initially taking circlip 58 therewith. In the first part of the rotation, the extended teeth on driver 52 will align with the slots 76 in the circlip 58. When, in this condition, the teeth on the coupler and driver align for engagement, the springs 36 force the driver teeth into engagement with the coupler teeth after which time pin 34 will rotate to engage the saddle-like depressions 70 in driver 52 to begin driving that axle, now the more slowly rotating axle. The final position of the components of the driving wheel is illustrated in FIG. 11.

When returning to driving straight after a turn, the position of the parts relative to each other will depend upon whether, and to what extent, the driver teeth aligned with the coupler teeth for engagement. Ultimately due to variations in terrain and slight course corrections along a straight path, the previously disengaged driver will become reengaged and transfer power from the pin to coupler or vice versa. In any event, because of the general symmetry of the parts, the operation will be as described, whether powering forward or in reverse around a curve, or using the engine for braking forward motion or rearward motion while going around the curve. Also, of course, when the wheel associated with the driver and coupler which are engaged at any given time begins to slip, the opposite driver and coupler, if not already engaged, will immediately engage, thereby providing the desired torque transferring differential action.

Figure 14:
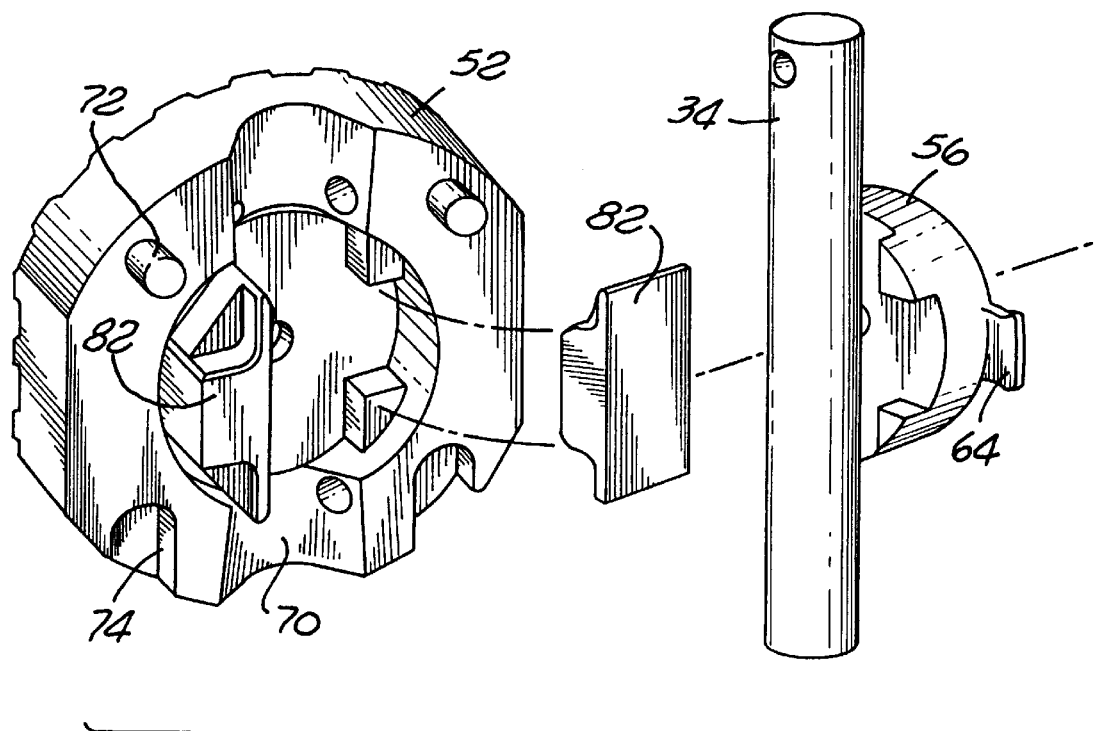
FIGS. 14, 15 and 16 illustrate an alternate embodiment for the spacers and related parts for coupling the spacers and pin 34 together for rotation in unison.
Figure 15:
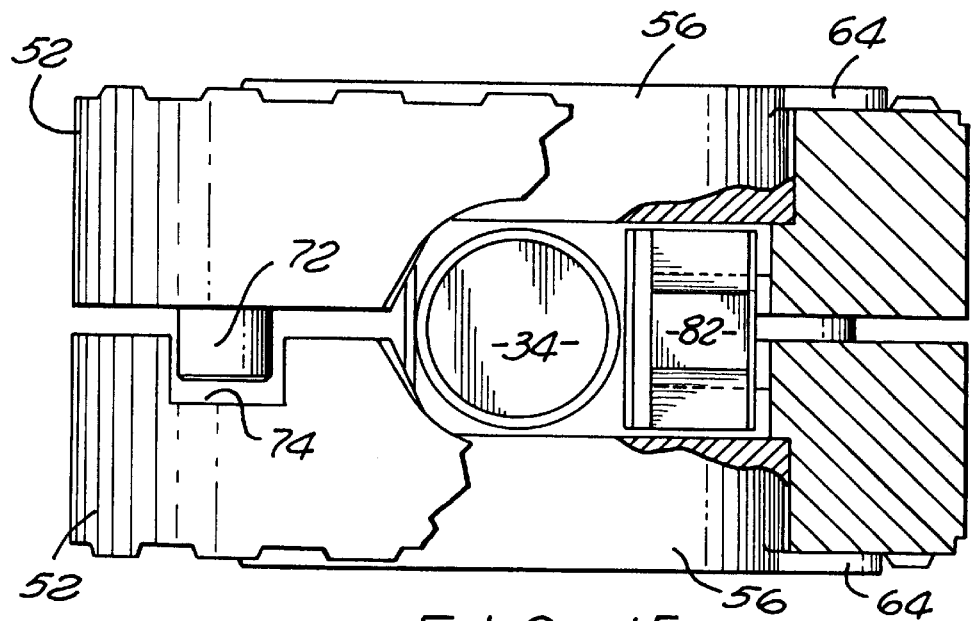
Figure 16:
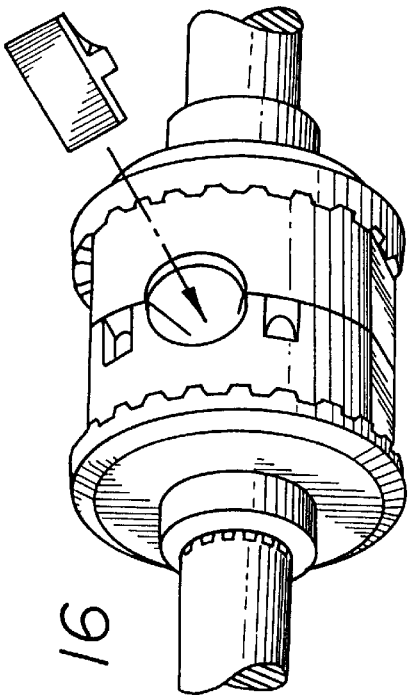

Now referring to FIGS. 14, 15, and 16, an alternate embodiment for the spacers 56 may be seen. In this embodiment, two additional shoes 82 are used, which interfit with inward protrusions on spacers 56 to rotationally lock the spacers together. Shoes 82 are specifically proportioned to fit through the saddle-like depressions 70 in the drivers 52 so that the same may be placed in position after the couplers, drivers, etc. have been assembled into the differential case. While the use of the modified spacers 56 and shoes 82 increases the number of parts, this alternate has the advantage of more directly coupling the spacers together, and has the further advantage of providing more accurate location of the spacers 56 with respect to the pin 34. It also provides for a more accurate positioning of the spacer paddle by the pin in cases where space required for installation of the axle retaining C-clip removes sufficient material from the spacer thickness as to prevent adequate fit between the spacer and the pin. In that regard, it will be noted from FIG. 4 that the top edges of slot 68 contact pin 34 at an angle so that the fit between pin 34 and slot 68 is not merely dependent upon the dimensions of the pin and the slot, but also various other dimensions of the mechanical parts, such as the axial length of the spacer 56 and the true position of the coupler 50 and can be affected by wear removing material from the coupler thrust surfaces. In the embodiment of FIGS. 14, 15 and 16 however, shoes 82 are contacted by pin 34 in a manner independent of the axial dimensions or positions of the various parts, so that the pin 34 and spacers 56 may be reasonably tightly locked with respect to each other, independent of any accumulation of axial tolerances in various other parts.

Figure 17:
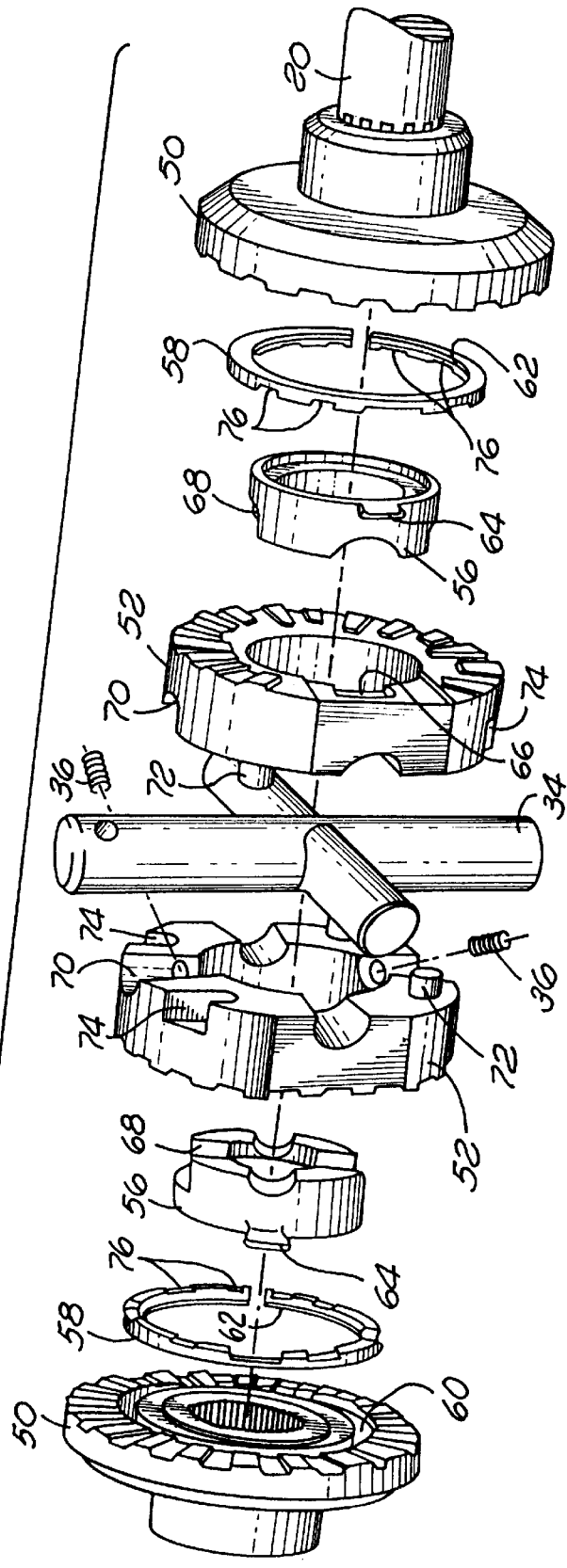
FIG. 17 is an exploded perspective view of an alternate embodiment of pin 34.

An additional alternate embodiment for the pin 34 may be seen in FIG. 17. Due to some differential designs containing more than 2 central bevel gears, additional pins are present to support these gears. Therefore, designs with 3 gears have three pins, 4 gears have four pins, etc. In this embodiment, two additional saddle cuts are represented in the driver, and are intended to interfit with the two added pins. Similarly, a design to accommodate three pins would include three saddle cuts. The previous discussion related to saddle backlash and the operational characteristics of the circlip and driver extended teeth would hold for these designs as well.

There has been disclosed and described herein a new and unique locking differential which, like its predecessor, may be assembled into a differential case without removal of the case from the differential housing, and which provides all of the desired features of a locking differential while at the same time eliminating a distracting sound and adverse cycling characteristic associated with the prior art differentials discussed. While the invention has been disclosed and described with respect to certain preferred embodiments thereof, it will be understood by those skilled in the art that various changes in form and detail may be made therein without departing from the spirit and scope of the invention.

What is claimed:

1. A quiet and smooth, positive acting, no-slip differential comprising:

first and second coaxial couplers for engaging first and second axles coaxial with the couplers, respectively;

a pinion pin between the couplers and having its axis substantially perpendicular to the axis of the couplers;

first and second drivers coaxial with and between the first coupler and the pinion pin, and the second coupler and the pinion pin, respectively, the first and second couplers and the first and second drivers having cooperatively disposed axially engagable teeth, the first and second drivers each partially surrounding the pinion pin and being moveable along the axis of the axles between a first position wherein the teeth on a respective driver and the respective coupler engage, and, unless restricted by engagement with the pinion pin, a second position wherein the teeth on a respective driver and the respective coupler may slide over each other, the teeth on the couplers and the drivers being inclined so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin, the pinion pin, when driven in rotation about the axis of the drivers and couplers, engaging one or both drivers at an angle sufficient to overcome the tendency of the teeth on the respective driver to climb the teeth on the respective coupler; and;

for each coupler, a first member forcibly rotatable relative to the respective coupler to first or second extreme positions relative to the pinion pin after the teeth on the respective driver have climbed the teeth on the respective coupler, the first member preventing substantial re-engagement of the teeth on the respective driver and coupler when in either of the first and the second extreme positions, and allowing engagement of the teeth on the respective driver and coupler when the first member is not near either the first or the second extreme position.

2. The quiet and smooth, positive acting, no-slip differential of claim 1 wherein the quiet and smooth, positive acting, no-slip differential is assembled through the opening in a differential case.

3. The quiet and smooth, positive acting, no-slip differential of claim 1 wherein the first member for each coupler is a split ring elastically engaging a ring groove in the respective coupler.

4. The quiet and smooth, positive acting, no-slip differential of claim 3 wherein the split rings are concentric to the axis of the couplers and the drivers, and each have a plurality of projections facing the respective driver, the drivers each having at least one protrusion or tooth extending to contact a respective projection on the respective split ring when the split ring is in either of the first and the second extreme positions to prevent substantial re-engagement of the teeth on the respective driver and coupler, and to not contact a respective projection on the respective split ring when the split ring is not near either the first or the second extreme position to allow re-engagement of the teeth on the respective driver and coupler.

5. The quiet and smooth, positive acting, no-slip differential of claim 4 wherein the drivers each having a plurality of teeth extending to contact a respective projection on the respective split ring.

6. The quiet and smooth, positive acting, no-slip differential of claim 5 wherein the top of the projections on each split ring extend to adjacent but not beyond the top of the teeth on the respective coupler, and the top of the extended teeth on each driver are substantially coplanar with the rest of the teeth on the driver.

7. The quiet and smooth, positive acting, no-slip differential of claim 4 wherein each driver has a second member rotatably fitting within the driver for coupling the pinion pin and the respective first member to allow the first member to rotate between first or second extreme positions relative to the pinion pin.

8. The quiet and smooth, positive acting, no-slip differential of claim 7 wherein each second member straddles the circumference of the pinion pin by less than 180° for engagement with the pinion pin, the second members being moveable toward each other for assembly purposes when the pinion pin is not in the assembled position.

9. The quiet and smooth, positive acting, no-slip differential of claim 7 wherein each second member straddles the circumference of the pinion pin by less than 180°, and further comprised of a pair of third members, the third members being insertable between the second members before the pinion pin is assembled into position, the third members contacting the pinion pin, after assembly of the pinion pin, in the region of the pinion pin between the second members.

10. The quiet and smooth, positive acting, no-slip differential of claim 7 wherein each second member engages the respective split ring between the projections approximately diametrically opposed to the split in the ring.

11. The quiet and smooth, positive acting, no-slip differential of claim 7 wherein each second member engages the respective split ring on the ends of the ring facing the split in the ring.

12. The quiet and smooth, positive acting, no-slip differential of claim 4 wherein for assembly purposes, before the pinion pin is assembled in position, the second member may be positioned relative to the respective drive member so as to not extend beyond the ends of the respective drive member.

13. A quiet and smooth, positive acting, no-slip differential comprising:

first and second coaxial axles; and, within a differential case;

first and second couplers coaxial with and engaging the first and second axles, respectively;

a pinion pin between the couplers, supported by the differential case and having its axis substantially perpendicular to the axis of the axles;

first and second drivers coaxial with the axles and between the first coupler and the pinion pin, and the second coupler and the pinion pin, respectively, the first and second couplers and the first and second drivers having cooperatively disposed axially engagable teeth, the first and second drivers each partially surrounding the pinion pin and being moveable along the axis of the axles between a first position wherein the teeth on a respective driver and the respective coupler engage, and, unless restricted by engagement with the pinion pin, a second position wherein the teeth on a respective driver and the respective coupler may slide over each other, the teeth on the couplers and the drivers being inclined so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin, the pinion pin, when driven in rotation about the axis of the drivers and couplers, engaging one or both drivers at an angle sufficient to overcome the tendency of the teeth on the respective driver to climb the teeth on the respective coupler; and;

for each coupler, a first member forcibly rotatable relative to the respective coupler to first or second extreme positions relative to the pinion pin after the teeth on the respective driver have climbed the teeth on the respective coupler, the first member preventing substantial re-engagement of the teeth on the respective driver and coupler when in either of the first and the second extreme positions, and allowing engagement of the teeth on the respective driver and coupler when the first member is not near either the first or the second extreme position.

14. The quiet and smooth, positive acting, no-slip differential of claim 13 wherein the differential case is a one piece differential case and the differential within the differential case are assembled therein through an opening in the differential case.

15. The quiet and smooth, positive acting, no-slip differential of claim 13 wherein the first member for each coupler is a split ring elastically engaging a ring groove in the respective coupler.

16. The quiet and smooth, positive acting, no-slip differential of claim 15 wherein the split rings are concentric to the axis of the couplers and the drivers, and each have a plurality of projections facing the respective driver, the drivers each having at least one protrusion or tooth extending to contact a respective projection on the respective split ring when the split ring is in either of the first and the second extreme positions to prevent substantial re-engagement of the teeth on the respective driver and coupler, and to not contact a respective projection on the respective split ring when the split ring is not near either the first or the second extreme position to allow re-engagement of the teeth on the respective driver and coupler.

17. The quiet and smooth, positive acting, no-slip differential of claim 16 wherein the drivers each having a plurality of teeth extending to contact a respective projection on the respective split ring.

18. The quiet and smooth, positive acting, no-slip differential of claim 17 wherein the top of the projections on each split ring extend to adjacent but not beyond the top of the teeth on the respective coupler, and the top of the extended teeth on each driver are substantially coplanar with the rest of the teeth on the driver.

19. The quiet and smooth, positive acting, no-slip differential of claim 16 wherein each driver has a second member rotatably fitting within the driver for loosely coupling the pinion pin and the respective first member to allow the first member to rotate between first or second extreme positions relative to the pinion pin.

20. The quiet and smooth, positive acting, no-slip differential of claim 19 wherein each second member straddles the circumference of the pinion pin by less than 180° for engagement with the pinion pin, the second members being moveable toward each other for assembly purposes when the pinion pin is not in the assembled position.

21. The quiet and smooth, positive acting, no-slip differential of claim 19 wherein each second member straddles the circumference of the pinion pin by less than 180°, and further comprised of a pair of third members, the third members being insertable between the second members before the pinion pin is assembled into position, the third members contacting the pinion pin, after assembly of the pinion pin, in the region of the pinion pin between the second members.

22. The quiet and smooth, positive acting, no-slip differential of claim 19 wherein each second member engages the respective split ring between the projections approximately diametrically opposed to the split in the ring.

23. The quiet and smooth, positive acting, no-slip differential of claim 19 wherein each second member engages the respective split ring on the ends of the ring facing the split in the ring.

24. The quiet and smooth, positive acting, no-slip differential of claim 16 wherein for assembly purposes, before the pinion pin is assembled in position, the second member may be positioned relative to the respective drive member so as to not extend beyond the ends of the respective drive member.

25. The quiet and smooth, positive acting, no-slip differential of claim 13 wherein the first and second drivers cannot both be in the second position wherein the teeth on both drivers may slide over the teeth of the respective couplers at the same time.

26. The quiet and smooth, positive acting, no-slip differential of claim 13 wherein the first and second drivers are proportioned to contact each other so that both drivers cannot be in the second position wherein the teeth on both drivers may slide over the teeth of the respective couplers at the same time.

27. The quiet and smooth, positive acting, no-slip differential of claim 13 wherein the drivers are restrained in relative motion about their axis to an angle greater than (i) that required to allow one of the drivers to move along the axis of the axles to the second position wherein the teeth on a respective driver and the respective coupler may slide over each other when the pinion pin is still engaging the other driver, and (ii) that required to rotate the first member relative to the respective coupler to either the first or the second extreme positions when the pinion pin is still engaging the other driver.

* * * * *